US007395894B2

(12) United States Patent
Jang et al.

(10) Patent No.: US 7,395,894 B2
(45) Date of Patent: Jul. 8, 2008

(54) SAFETY LEVER SYSTEM IN CAB OF EXCAVATOR

(75) Inventors: Sun Oh Jang, Masan (KR); Hak Shin Kim, Masan (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 373 days.

(21) Appl. No.: 11/180,011

(22) Filed: Jul. 12, 2005

(65) Prior Publication Data

US 2006/0232116 A1 Oct. 19, 2006

(30) Foreign Application Priority Data

Feb. 18, 2005 (KR) ...................... 10-2005-0013636

(51) Int. Cl.
*B60D 1/28* (2006.01)

(52) U.S. Cl. ...................................... 180/271; 180/334

(58) Field of Classification Search ................. 180/271, 180/333, 334; 74/469, 471 R, 471 XY, 523, 74/525

See application file for complete search history.

(56) References Cited

U.S. PATENT DOCUMENTS

| | | | | |
|---|---|---|---|---|
| 5,860,488 | A * | 1/1999 | Kim | 180/271 |
| 6,352,133 | B1 * | 3/2002 | Ojima | 180/326 |
| 2004/0154427 | A1 | 8/2004 | Jo et al. | |

FOREIGN PATENT DOCUMENTS

| | | |
|---|---|---|
| DE | 197 29 873 A1 | 2/1998 |
| EP | 1 122 368 A1 | 8/2001 |
| FR | 2 816 727 A1 | 5/2002 |
| JP | 09013425 | 1/1997 |
| JP | 09041426 | 2/1997 |
| JP | 09203084 | 8/1997 |
| JP | 10280483 | 10/1998 |
| JP | 2000328604 | 11/2000 |
| JP | 200126950 | 1/2001 |
| JP | 200140707 | 2/2001 |
| JP | 2001329572 | 11/2001 |

OTHER PUBLICATIONS

Patent Abstract of JP 09013425.

(Continued)

*Primary Examiner*—Faye M. Fleming
(74) *Attorney, Agent, or Firm*—Ladas and Parry LLP

(57) ABSTRACT

The present invention relates to a safety lever system in a cab of an excavator, which is capable of preventing an unintended descending of a control box without the operation of the safety lever, and promoting a safer tilting of the control box through a limit means that controls the power application/short-circuit. According to the present invention, if the operator tilts the control box to get in or get out of the cab, the safety lever system shunts (i.e., short-circuit) the power of the control lever or the control box. Therefore, the possibility of malfunction of the excavator due to the miss-operation of the operator is very slim, and the control box cannot be returned to its original position unless the operator operates the safety lever again. This structural improvement of the safety lever eliminates a possibility of the malfunction of the excavator due to the operator's mistake, and markedly increases the reliability of the excavator.

11 Claims, 6 Drawing Sheets

OTHER PUBLICATIONS

Patent Abstract of JP 09041426.
Patent Abstract of JP 09203084.
Patent Abstract of JP 200140707.
Patent Abstract of JP 200126950.
Patent Abstract of JP 2001329572.
Patent Abstract of JP 2000328604.
Patent Abstract of JP 10280483.

* cited by examiner

SAFETY LEVER SYSTEM IN CAB OF EXCAVATOR

BACKGROUND OF THE INVENTION

1. Field of the Invention

The present invention relates in general to a safety lever system in the cab of an excavator, more specifically, to a safety lever system in the cab of an excavator for preventing failures and malfunctions of control levers occurring when an operator gets in or gets out of the cab.

2. Description of the Related Art

In general, when a heavy equipment operator gets in or gets out of the operator's cab by tilting a control box equipped with a control lever upward, a safety lever system installed in the operator's cab turns off the power for safety's sake. Sometimes, however, the operator mistakenly operates control levers or buttons, causing the miss-operation of related parts. Therefore, in order to prevent the malfunction of heavy equipment and unexpected accidents, the safety lever system remains shut down until the operator operates the system.

Technologies related to the safety lever system have been disclosed and claimed by the same applicant in Korean Patent Application Nos. 1996-0032082 (titled "Safety lever device of heavy equipment"), 2003-0008834 (titled "Control lever safety device of heavy equipment"), and 2003-0008991 (titled "Control lever safety device of heavy equipment") that are applied or assigned.

The foregoing disclosures suggest that the (control) lever safety device is able to prevent failures or malfunctions of heavy equipment caused by an operator's mistake in the operation of a control lever or a control box during tilting the control box. According to the disclosures, unless the operator operates the safety lever by means of a limit switch or other instrument for applying/short-circuiting the power, the heavy equipment remains shut down.

As with the technologies and advantages pertained in the above-described inventions, the present invention introduces a more improved safety lever system by way of representation and not limitation.

SUMMARY OF THE INVENTION

It is, therefore, an object of the present invention to provide a safety lever system in a cab of an excavator, in which the safety lever is disposed at the front side of the cab (or the operator's seat) to secure more space for the access of an operator.

According to a preferred embodiment of the present invention, the safety lever system in the cab of the excavator is connected to a tilting device that is used for tilting the control box, and a limit means that is interlocked with the tilting device for controlling the power.

As for the tilting device in the exemplary embodiment, a rotating bracket connected to the safety lever is hinged at the rotation axis, and a spring bracket is hinged below that. When the safety lever is operated, the rotating bracket and the spring bracket rotate interlockingly for tilting. After the tilting is finished, the spring bracket is suspended on a suspension end. Therefore, unless the safety lever is operated again, the control box cannot descend anymore.

As for the limit means in the exemplary embodiment, a limit switch is installed on a control box as one body. Thus, when the control box tilts as a result of the rotation of the tiling device, the limit switch also moves along the tilting angle and is guided by a limit holder disposed at a predetermined distance away. In this manner, the limit means can apply or shunt (i.e., short-circuit) the power.

Therefore, the object of the present invention is to provide a safety lever system in a cab of an excavator, capable of preventing an unintended descending of a control box without the operation of the safety lever, and promoting a safer tilting of the control box through a limit means that controls the power application/short-circuit.

To achieve the above object, there is provided a safety lever system in a cab of an excavator, in which the system includes: a fixed plate fixed on cab of an excavator, having a rotation axis; operator's seat fixed on the fixed plate; a control box movably installed on the rotation axis of the fixed plate as one body to descend or ascend around the rotation axis, and having a control lever; a safety lever protruded to the front side of the control box, and if pulled upward by an operator, tilting the control box upward by interlocking; a tilting device, which is connected to one end of the safety lever, operates with the control box as one body, is hinged at a hinge axis and interlocks in an operational direction of the safety lever around the axis for rotating the control box and then immobilizing or fixing the control box when stopped; and a limit means installed on one side of the control box for applying/short-circuiting power to/from the control box by rotating at the same angle as the tilted control box.

Preferably, the tilting device includes a rotating bracket connected to one end of the safety lever, and is hinged at a hinge axis, being extended; and a spring bracket hinged equally at the hinge axis below the rotating bracket.

Preferably, the rotating bracket has an extended end of a designated length, and to a guide pin in opposite direction of the end.

Preferably, the tilting device further includes a first cylinder rotatably installed on the end of the rotating bracket.

Preferably, the control box further includes a rotation stopper for controlling a rotation interval of the back and forth rotation of the end of the rotation bracket.

Preferably, the tilting device further includes an elastic body for elastically supporting the spring bracket.

Preferably, the fixed plate further includes a fixed axis that is suspended by a suspension end of the spring bracket for fixing the control box.

Preferably, the tilting device further includes a second cylinder connected to the control box and the fixed plate for limiting a tilting distance thereof.

Preferably, the suspension end of the spring bracket is protrusively formed on a position as opposed to the extended end of the rotating bracket, and when tilted, is suspended by the fixed axis for fixing the control box.

Preferably, the suspension end includes a suspension groove where the fixed axis is inserted.

Preferably, the spring bracket includes a guide groove for guiding the inserted guide pin, and a groove for operation for guiding the fixed axis.

Preferably, the spring bracket further includes a guide surface for guiding the fixed axis to the groove for operation during restoration.

Preferably, the limit means includes a limit holder fixed on the rotation axis of the fixed plate; and a limit switch being turned on/off along the limit holder according to a tilting angle of the control box. Preferably, the limit holder has a guide for adjusting an operating depth of the limit switch.

Preferably, the limit switch moves along the guide, and the operating depth thereof is adjustable.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
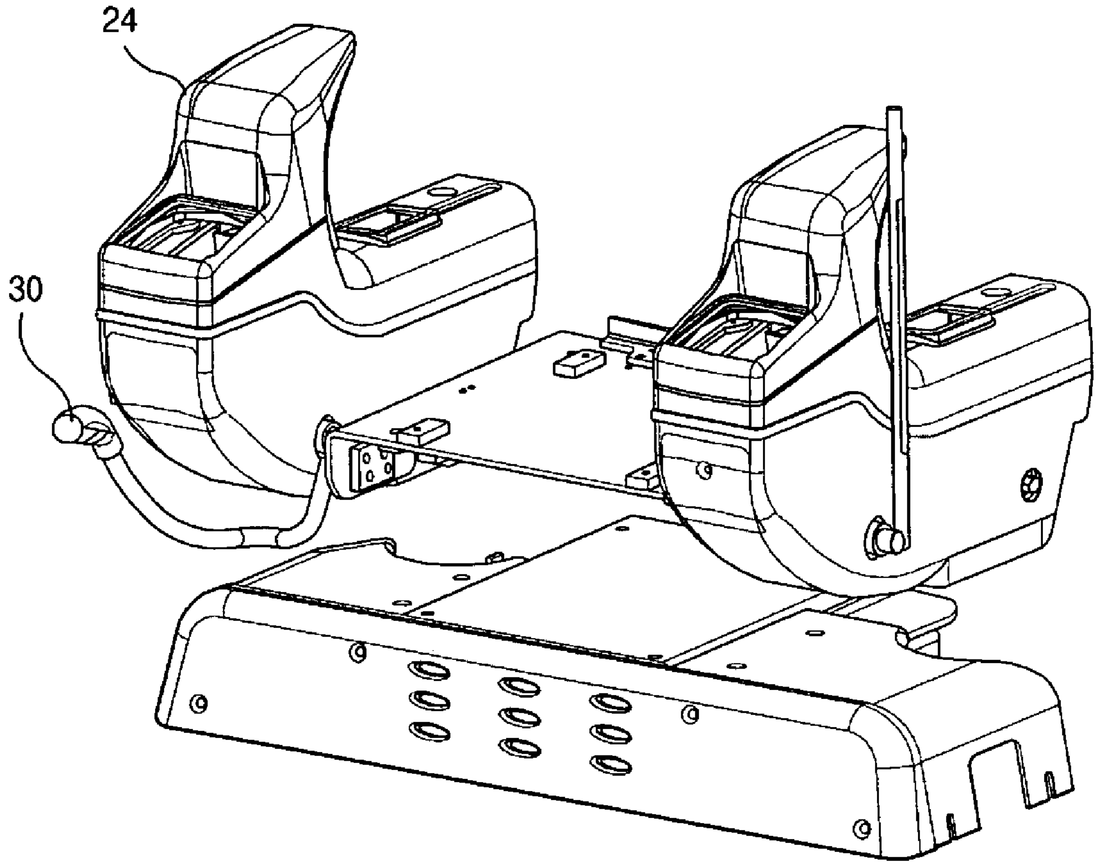
FIG. 1 is a perspective view of a safety lever system being installed in an operator's cab, according to the present invention.
Figure 2:
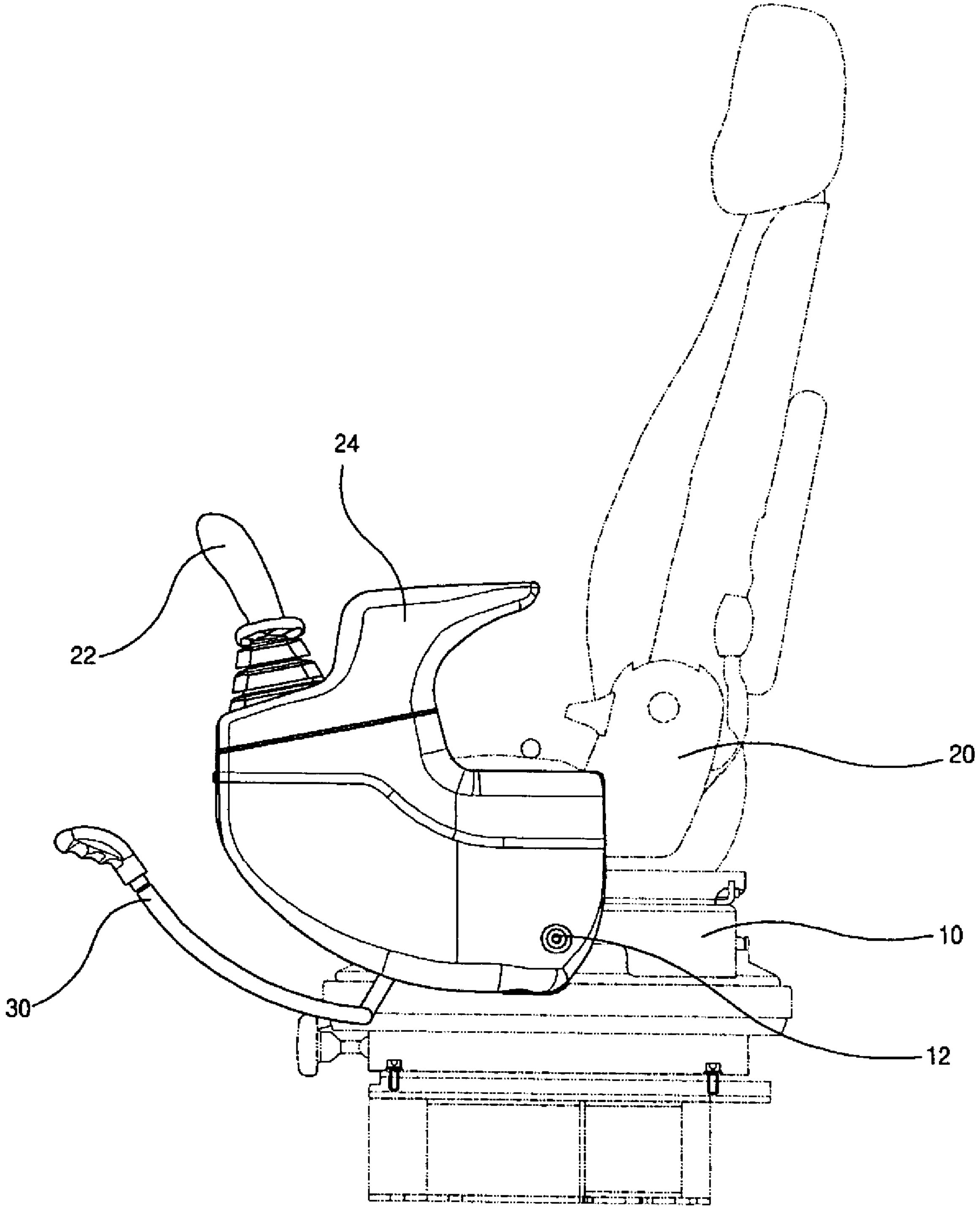
FIG. 2 is a side view of a safety lever system in a cab of an excavator, according to the present invention.
Figure 3:
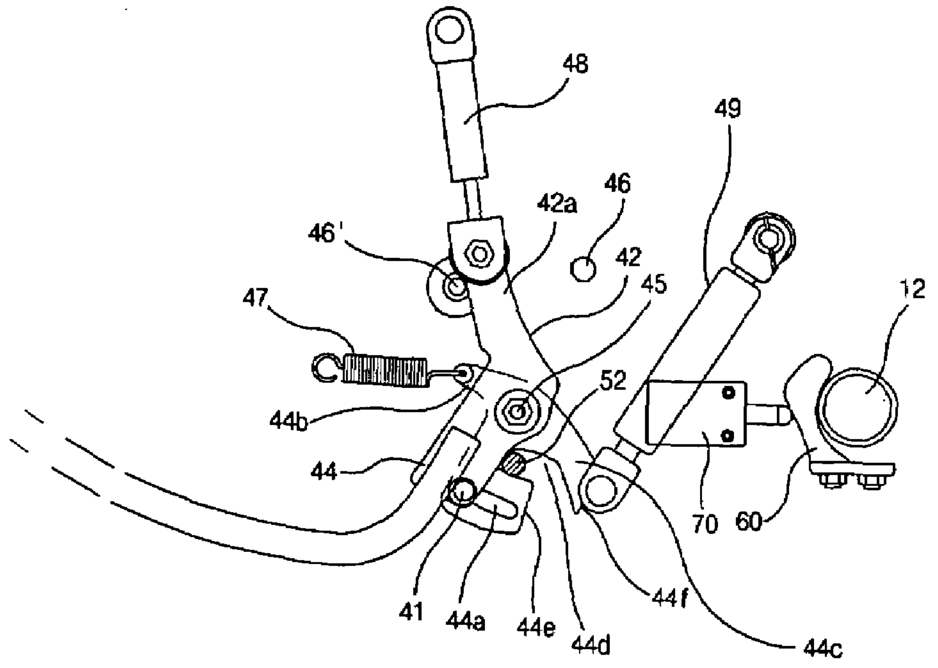
FIG. 3 is an exploded view of FIG. 2.

FIG. 1 is a perspective view of a safety lever system being installed in an operator's cab, according to the present invention, FIG. 2 is a side view of the safety lever system in the cab of an excavator, according to the present invention; and FIG. 3 is an exploded view of FIG. 2.

Referring to FIG. 1 to FIG. 3, the safety lever system in a cab includes a fixed plate 10 fixed on the main body of an excavator and having a rotation axis 12 formed therein; operator's seat 20 mounted on the top of the fixed plate 10; a control box 24 installed on the fixed plate 10 and having a control lever 22; a safety lever 30 protruded to the front side of the control box 24, and if pulled upward by an operator, tilting the control box 24 upward; a tilting device, which is connected to one end of the safety lever 30, operates with the control box 24 as one body, is hinged at a hinge axis 45 and interlocks in an operational direction of the safety lever 30 around the hinge axis 45 for rotating the control box 24 and then immobilizing or fixing the control box 24 when stopped; and a limit means installed on one side of the control box 24 for applying/short-circuiting power to/from the control box 24 by rotating at the same angle as the tilted control box 24.

In the foregoing description, the 'front side' means the front direction of the operator sitting on the operator's seat 20, and the 'upward' direction means that the safety lever 30 is pulled upward.

As depicted in FIGS. 1 and 2, the fixed plate 10 indicates a fixed frame installed in the main body of an excavator, and the operator's seat 20 is mounted thereon.

The control box 24 is movably installed on the fixed plate 10, preferably, being tiltably or pivotably connected to the rotation axis 12. Here, the rotation axis 12 is fixed on the fixed plate 10, and the control box 24 is inserted therein and pivots around the rotation axis 12.

The control lever 22 is installed on the front upper part of the control box 24, interlocking with the control box 24 as one body. The control lever 22 is used for operating a boom or a bucket of the excavator, whereas the control box 24 is responsible for delicate control of the excavator.

Also, varieties of touch buttons are formed protrusively from the surface of the control box 24. The power is applied or short-circuited to or from the buttons, and the operator simply presses necessary buttons to perform a work required. Unfortunately however, sometimes those protruded button(s) on the control box 24 are mistakenly pressed by unconscious action of operators. Although it must be unintentional, that kind of mistake often ends up with accidents.

As already explained in the Description of the Related Art, the operator tilts the control box 24 upward when he gets in or gets out of the cab and secure a certain control space for operator. In order to minimize a possibility of the miss-operation of the excavator as a result of the operator's inadvertent touch on the control lever 22 or the control box 24 while getting in or getting out of the cab, the safety lever system is built in the cab of the excavator. In the present invention, the safety lever 30 is protruded to the front side of the control box 24. When the operator pushes the safety lever 30 upward, the control box 24 is tilted upward.

As shown in the drawing, the safety lever 30 is located around the knees of the operator sitting on the operator's seat 20, and its protruded structure to the front side blocks the operator from the side.

Therefore, the reason for designing the safety lever 30 to be protruded to the front side is to block or interrupt the operator's free movement to get in the cab, and remind the operator of his (her) responsibilities to be careful about the operation of the control lever 22 or the control box 24 to prevent any miss-operation thereof.

As shown in FIG. 1 to FIG. 3, one end of the tilting device for tilting the control box 24 through the operation of the safety lever 30 is connected to one end of the safety lever 30, and the tilting device and the control box 24 operate together as one body. Also, the tilting device is hinged at the hinge axis 45 and interlocks with the safety lever 30 in its operational direction. In so doing, the tilting device rotates and then immobilizes (or fixes) the control box 24.

More specifically, a rotating bracket 42 connected to one end of the safety lever 30 is hinged at the hinge axis 45 and is extended. Similarly, a spring bracket 44 is hinged at the hinge axis 45 in such a manner that the rotating bracket 42 is connected. And the spring bracket 44 is connected to the lower part of the rotating bracket 42.

The safety lever 30 supplies the rotational force to the rotating bracket 42 and the spring bracket 44. The rotation of the spring bracket 44 will be described later.

As shown in FIG. 3, the rotating bracket 42 has an end *42a* as one body with a designated length extended to one side. When the rotating bracket 42 rotates around the rotating axis 45 by the applied force from the safety lever 30, the end *42a* withdraws the force outside at a certain angle. Thus, the rotating bracket 42 moves at an angle proportional to the rotation angle of the safety lever 30. As can be seen in the drawing, the rotating bracket is also connected to a guide pin 41 in the opposite direction of the end *42a*.

The control box 24 further includes rotation stoppers 46, 46' for limiting the rotation interval of the end *42a* of the rotating bracket 42. When the end *42a* rotates back and forth as a result of the operation of the safety lever 30, the rotation stoppers 46, 46' limit the rotation interval of the end *42a*.

Moreover, a first cylinder 48 is movably hinged at the end *42a* of the rotating bracket 42.

The first cylinder 48, with the function of a rotatable link, extends or contracts by a designated length. The first cylinder 48 not only extends or contracts during the rotation of the end *42a*, but also absorbs the rotational shock.

The tilting device of the present invention also includes a second cylinder 49 disposed at a predetermined distance apart from the control box 24 and the fixed plate 10. When the safety lever 30 is in operation, the rotating bracket 42 and the spring bracket 44 rotate and the control box 24 tilts. At this time, the second cylinder 49 limits the tilting angle or the tilting distance of the control box 24.

As described before, the spring bracket 44 is disposed at the lower part of the rotating bracket 42. The spring bracket 44, as one of elements of the tilting device, fixes the control box 24 or makes the control box 24 rest on its original position.

Again as aforementioned, the spring bracket 44 is hinged at the same hinge axis 45 as the rotating bracket 42, and rotates around the hinge axis 45.

The spring bracket 44 has a guide groove 44*a* into which the guide pin 41 connected to the rotating bracket 42 is inserted.

The guide pin 41 moves along the guide groove 44*a*. As the guide pin 41 hits a finished part of the guide groove 44*a*, the force from the guide pin 41 makes the spring bracket 44 move in the same direction as the rotating bracket 42.

Therefore, unless the control box 24 is tilted, the spring bracket 44 always faces downward. Also, an elastic body 47 is connected to one end 44*b* of the spring bracket 44. Suppose that the operator wants to return the upwardly tilted control box 24 for work, the operator has to press the control box 24 without operating the safety lever 30. In this case, a fixed axis 52 protruded from the fixed plate 10 ensures that the control box 24 is not restored any further—because the fixed axis 52 is suspended on a suspension groove 44*f* formed on a suspension end 44*c* of the spring bracket 44.

The end 44*b* and the suspension end 44*c* of the spring bracket 44 are disposed in the opposite direction with respect to the hinge axis 45.

Besides the suspension end 44*c*, the spring bracket 44 further includes a groove for operation 44*d* and a guide surface 44*e* for guiding the fixed axis 52 during the rotation of the spring bracket 44. Upon the operation of the tilting device, the groove for operation 44*d* attaches or detaches the fixed axis 52. In the meantime, when the control box 24 returns to its original position, the guide surface 44*e* guides the fixed axis 52 to insert back to the groove for operation 44*d*.

It should be recognized that diverse modifications involving other features and shapes can also be used.

In order to prevent the miss-operation of the control lever 22 or the control box 24 after tilting, the safety lever system of the present invention also includes the limit means for cutting off the power supply to the control box 24.

The limit means includes a limit holder 60 fixed on the rotation axis 12 of the fixed plate 10, and a limit switch 70 guided along the limit holder 60 in accordance with the tilting angle of control box 24.

The limit switch 70 is electrically connected to the control box 24 and to a power supply means (not shown). Thus, the power of the control box 24 is turned on/off through the operation of the limit switch 70.

The limit holder 60 has the spiral guide which guides the limit switch 70 as one body. Therefore, it is preferable to use a roller plunger type limit switch which operates according to the depth of the guide. The limit switch 70 interlockingly operates with the tilting device and turns off the power the same time with the tilting. As such, the limit means makes sure that the control box 24 does not descend unless the safety lever 30 is operated again, and applies/short-circuits the power according to the position of the control box 24, whereby control box 24 can be very safely tilted.

The following will now explain the operational process of the safety lever system in the cab of an excavator and safety effects thereof.

FIG. 4 to FIG. 10 are operational flow diagrams illustrating the operation of the safety lever system in the cab of an excavator, according to the present invention.

Figure 4:
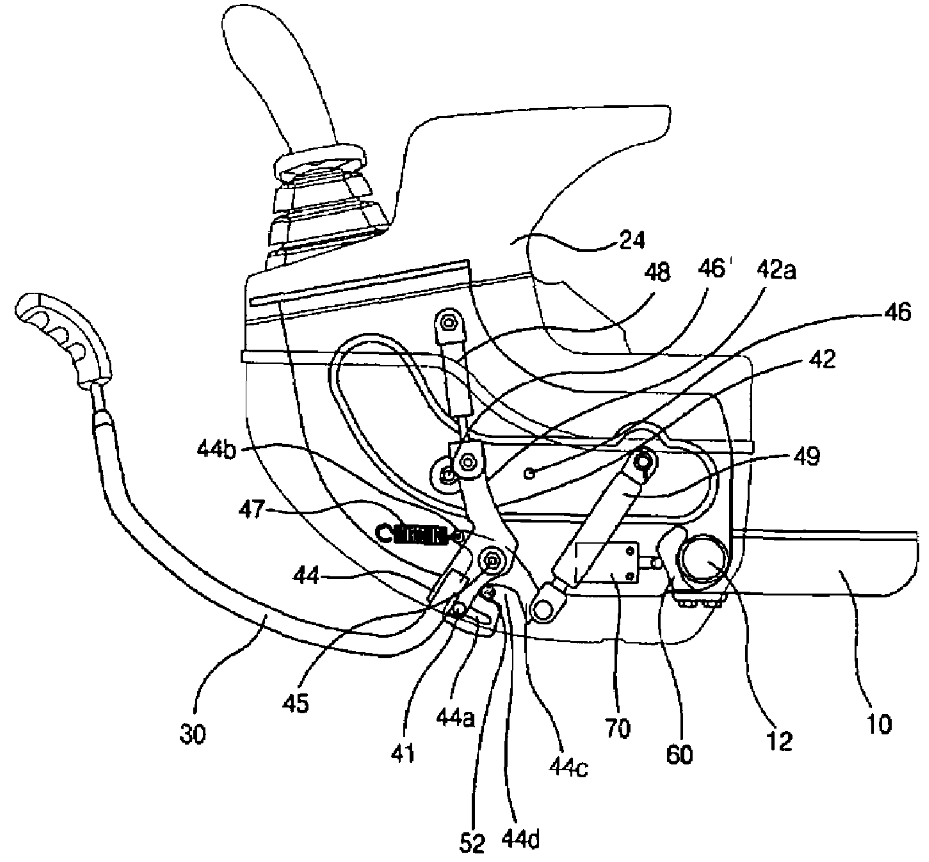
FIGS. 4 to 10 are operational flow diagrams illustrating an operation of a safety lever system in a cab of an excavator, according to the present invention.
Figure 5:
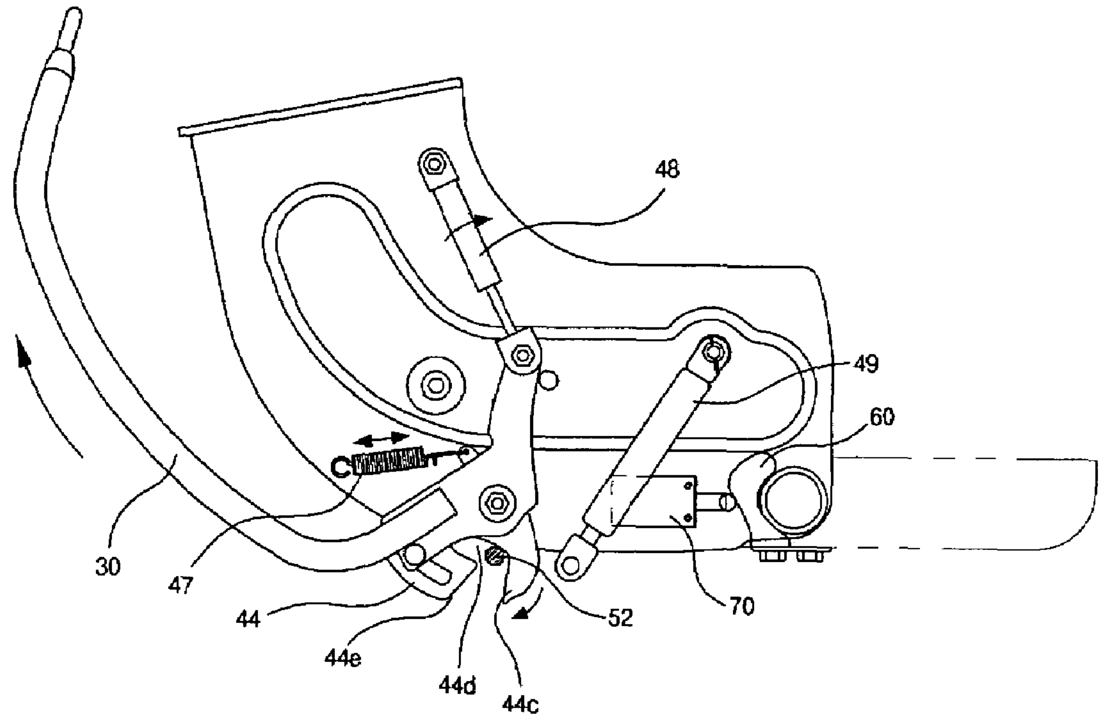

As shown in FIG. 4 and FIG. 5, when the safety lever 30 is pushed upward, the rotating bracket 42 connected to one end of the safety lever 30 rotates interlockingly with the safety lever 30 in the same direction. And, the end 42*a* and the first cylinder 48 expand and rotates backward until they are suspended by the rotation stopper 46. At the same time, the guide pin 41 of the rotating bracket 42 moves along the guide groove 44*a* until it is blocked at the finished part of the guide groove 44*a*, and generates a force for rotating the spring bracket 44 upward.

Meanwhile, the fixed axis 52 first moves along the groove for operation 44*d* of the spring bracket 44 and eventually escapes from the groove 44*d* to release the spring bracket 44 and tilt the control box 24. Then, the elastic body 47 connected to the one end 44*b* of the spring bracket 44 is expanded.

Figure 6:
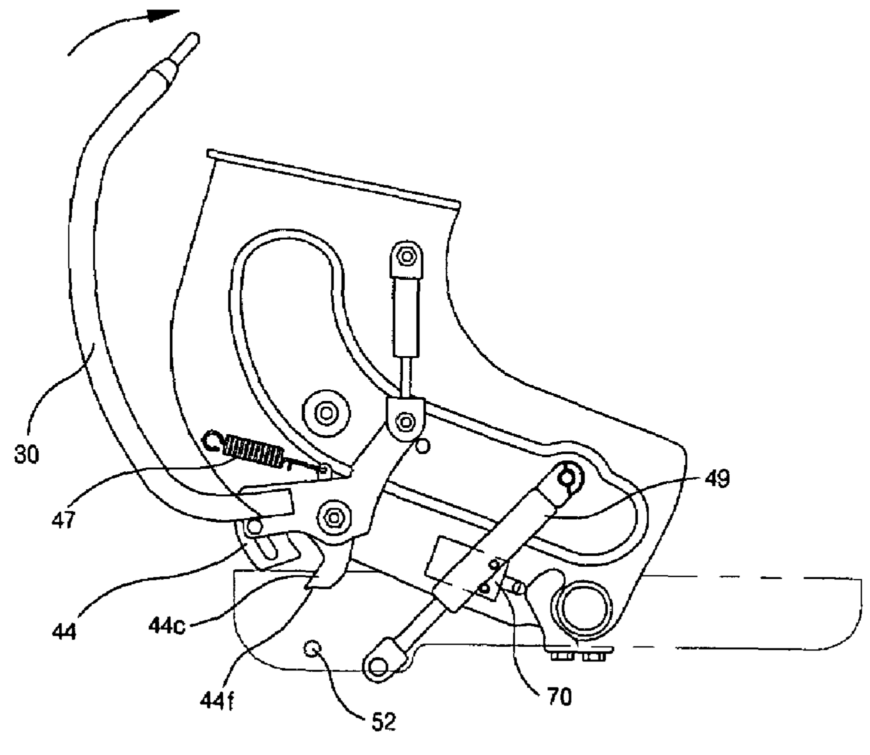

FIG. 6 illustrates the control box 24 that is completely tilted. In this state, the elastic body 47 and the second cylinder 49 are expanded to the full range. By the released spring bracket 44 and the operation of the second cylinder 49, the control box 24 ascends and the fixed axis 52 is completely broken away the spring bracket 44.

At this time, the suspension end 44*c* is placed right above the fixed axis 52 and simultaneously, the limit switch 70 is guided by the limit holder 60. When the limit switch 70 reaches a designated height, it turns off the control box 24.

In FIG. 6, the control box 24 is completely tilted. In this case, the fixed axis 52 is placed right below the suspension end 44*c* of the spring bracket 44. Therefore, even though the control box 24 could be deliberately pressed downward, the fixed axis 52 is inserted into the suspension groove 44*f* of the suspension end 44*c* and does not descend further, resultantly preventing the control box 24 from falling. In this manner, the power of control box 24 remains turned off.

Figure 7:
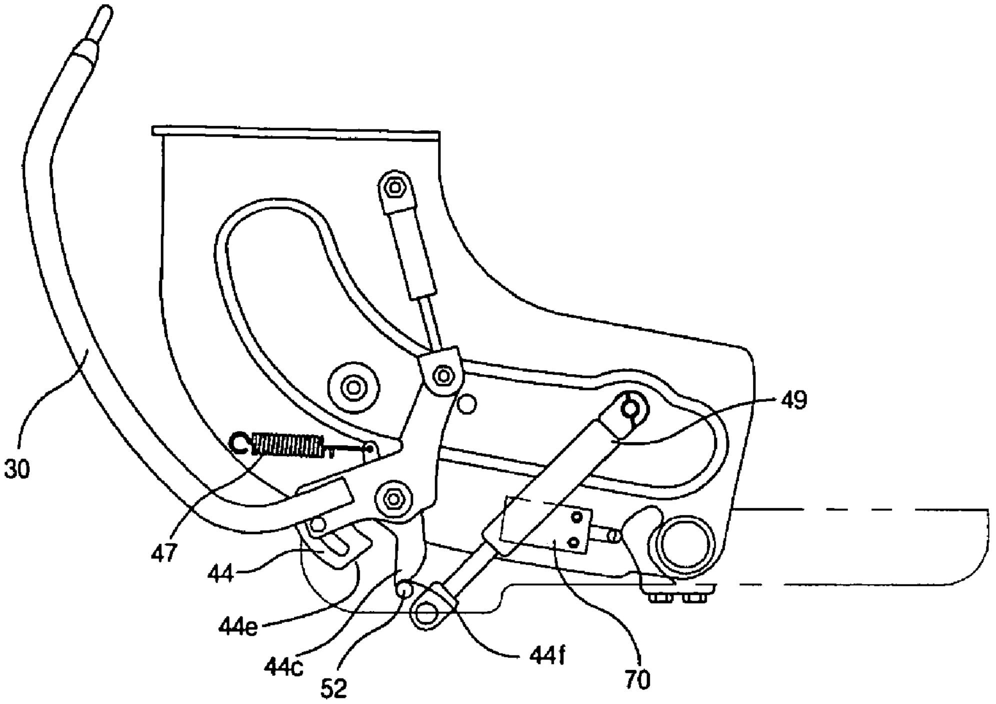

FIG. 7 illustrates a case, in which the control box 24 is dropped without operating the safety lever 30. Again in this case, the fixed axis 52 is inserted into the suspension groove 44*f* and does not descend further. Therefore, absolutely no power is supplied to the limit switch 70, and the miss-operation thereof can be prevented.

Figure 8:
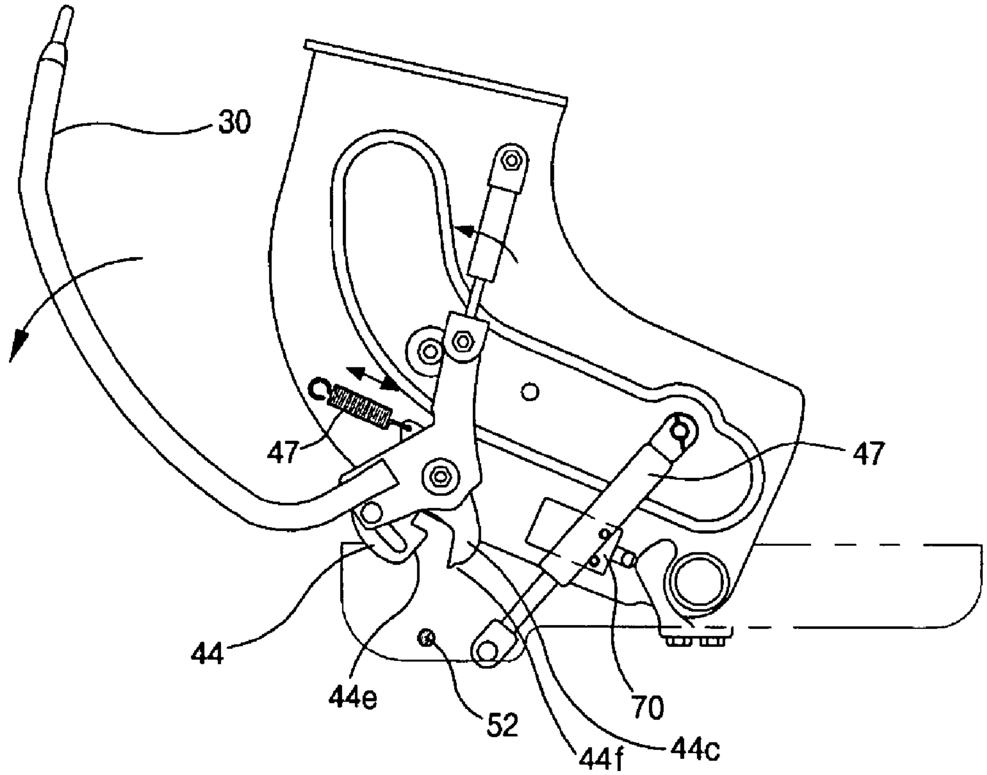

Referring to FIG. 8, after the safety lever 30 is pushed downward, if the control box 24 descends, the suspension groove 44*f* is located on the upper right side of the fixed axis 52. Thus, the fixed axis 52 does not fit into the suspension groove 44*f*.

Figure 9:
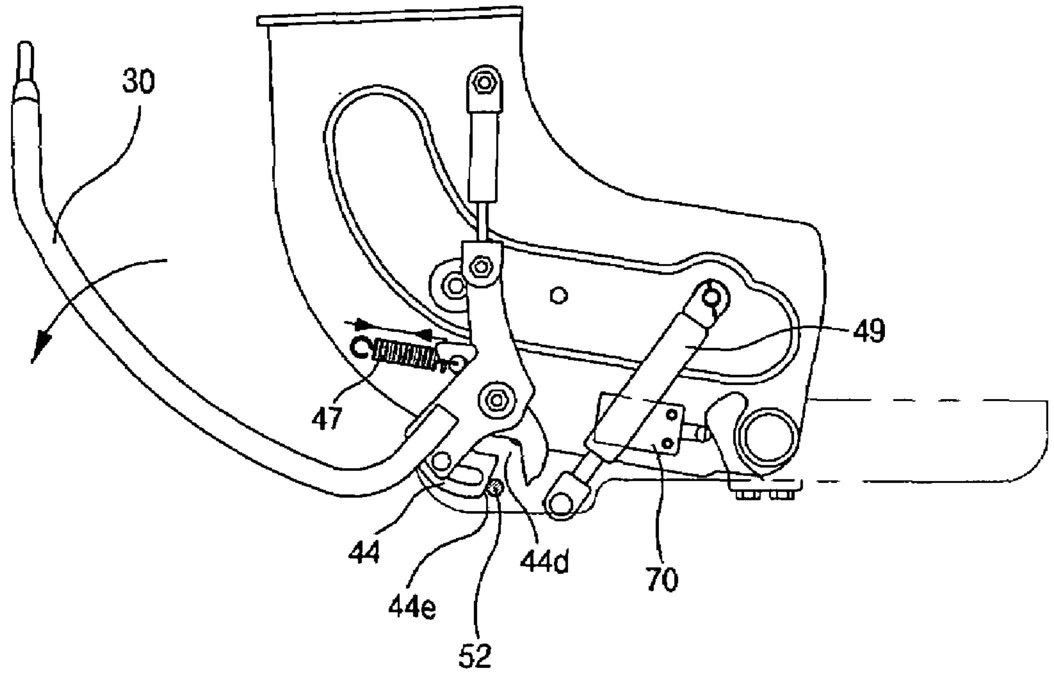

As can be seen in FIG. 9, if the control box 24 descends further, the guide surface 44*e* of the spring bracket 44 is placed to the upper direction for the fixed axis 52.

When the elastic body 47 contracts, the second cylinder 49 is constricted. And, the fixed axis 52 moves along the guide surface 44*e* of the spring bracket to be inserted into the groove for operation 44*d*.

Figure 10:
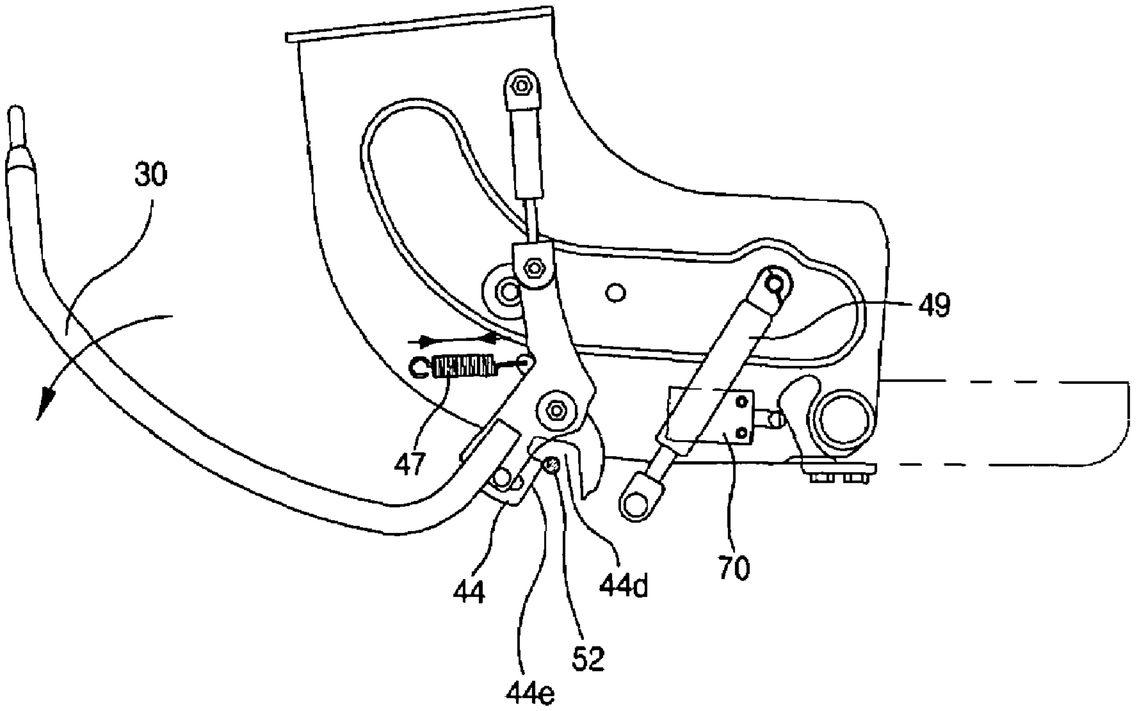

Lastly, FIG. 10 illustrates that the fixed axis 52 reached the end of the guide surface 44*e*, and is inserted into the groove for operation 44*d* by the restoring force of the elastic body 47. At this time, the limit switch 70 moves downward along the limit holder 60 and turns on the power.

When the safety lever 30 descends further, as shown in FIG. 4, the fixed axis 52 is completely inserted into the groove for operation 44*d*, and the elastic body 47 is completely restored.

Therefore, with the help of the tilting device and the limit means of the present invention, the control box 24 can be tilted completely and its power can be turned on/off more safely, which in turn prevents the malfunction of the excavator caused by the miss-operation of the operator.

As set forth above, if the operator tilts the control box 24 to get in or get out of the cab, the safety lever system in the cab of the excavator of the present invention shunts (i.e., short-circuit) the power of the control lever 22 or the control box 24. In this way, the possibility of malfunction of the excavator due to the miss-operation of the operator is very slim, and the control box 24 cannot be returned to its original position unless the operator operates the safety lever 30 again. This structural improvement of the safety lever eliminates the possibility of malfunction of the excavator due to the operator's mistake, and markedly increases the reliability of the excavator.

While the invention has been described in conjunction with various embodiments, they are illustrative only. Accordingly, many alternative, modifications and variations will be apparent to persons skilled in the art in light of the foregoing detailed description. For example, the suspension end 44*c* for suspending the fixed axis 52 can have the same shape as the fixed axis 52. The foregoing description is intended to embrace all such alternatives and variations falling with the spirit and broad scope of the appended claims.

What is claimed is:

1. A safety lever system in a cab of an excavator, the system comprising:

a fixed plate fixed in the cab, having a rotation axis;

operator's seat fixed on the fixed plate;

a control box movably installed on the rotation axis of the fixed plate as one body to descend or ascend around the rotation axis, and having a control lever;

a safety lever protruded to the front side of the control box, and if pulled upward by an operator, tilting the control box upward by interlocking;

a tilting device, which is connected to one end of the safety lever, operates with the control box as one body, is hinged at a hinge axis and interlocks in an operational direction of the safety lever around the axis for rotating the control box and then immobilizing or fixing the control box when stopped; and a limit means installed on one side of the control box for applying/short-circuiting power to/from the control box by rotating at the same angle as the tilted control box, wherein the tilting device is comprised of:

a rotating bracket connected to one end of the safety lever, and is hinged at a hinge axis, being extended;

a spring bracket hinged equally at the hinge axis below the rotating bracket; and a first cylinder rotatably installed on the end of the rotating bracket.

2. The safety lever system according to claim 1, wherein the control box further comprises a rotation stopper for controlling a rotation interval of the back and forth rotation of the end of the rotation bracket.

3. The safety lever system according to claim 1, wherein the fixed plate further comprises a fixed axis that is suspended by a suspension end of the spring bracket for fixing the control box.

4. The safety lever system according to claim 1, wherein the tilting device further comprises a second cylinder connected to the control box and the fixed plate for limiting a tilting distance thereof.

5. The safety lever system according to claim 4, wherein the suspension end of the spring bracket is protrusively formed on a position as opposed to the extended end of the rotating bracket, and when tilted, is suspended by the fixed axis for fixing the control box.

6. The safety lever system according to claim 3, wherein the suspension end comprises a suspension groove where the fixed axis is inserted.

7. The safety lever system according to claim 1, wherein the spring bracket comprises a guide groove for guiding the inserted guide pin, and a groove for operation for guiding the fixed axis.

8. The safety lever system according to claim 1, wherein the spring bracket further comprises a guide surface for guiding the fixed axis to the groove for operation during restoration.

9. The safety lever system according to claim 1, wherein the limit means is comprised of:

a limit holder fixed on the rotation axis of the fixed plate; and a limit switch being turned on/off along the limit holder according to a tilting angle of the control box.

10. The safety lever system according to claim 9, wherein the limit holder has a guide for adjusting an operating depth of the limit switch.

11. The safety lever system according to claim 9, wherein the limit switch moves along the guide, and the operating depth thereof is adjustable.

* * * * *